July 3, 1962 L. E. HECKATHORN ET AL 3,042,120
TWO WAY PLOW
Filed Feb. 5, 1960 4 Sheets-Sheet 1

LOYD E. HECKATHORN,
SAMUEL J. COUGHRAN,
INVENTORS.

BY THEIR ATTORNEYS.

Harris, Kiech, Russell & Kern.

Lloyd E. Heckathorn,
Samuel J. Coughran,
INVENTORS.

BY THEIR ATTORNEYS.

Harris, Kiech, Russell & Kern.

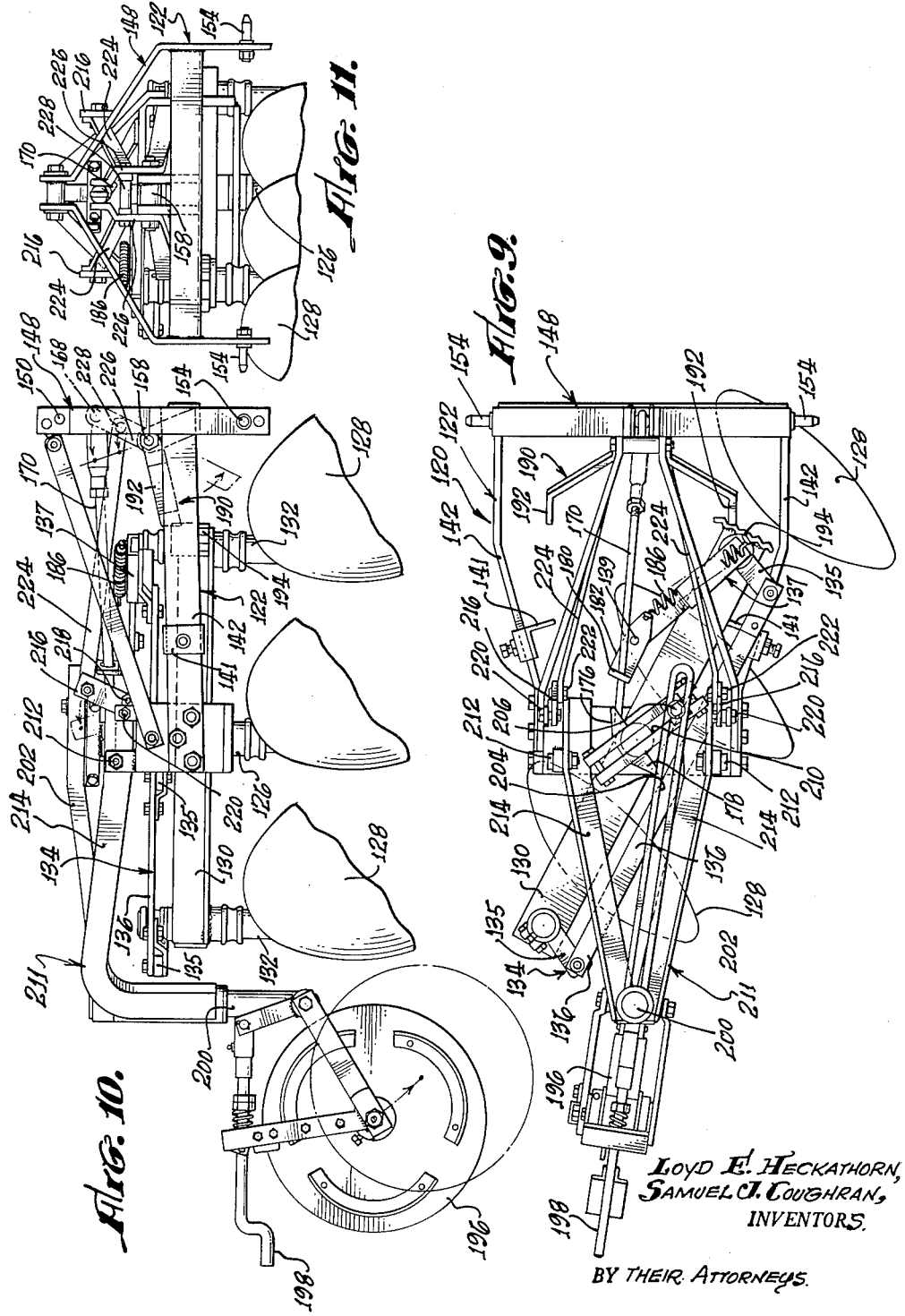

3,042,120
TWO WAY PLOW
Loyd E. Heckathorn, Garden Grove, and Samuel J. Coughran, Fullerton, Calif., assignors to Towner Manufacturing Company, Santa Ana, Calif., a corporation of California
Filed Feb. 5, 1960, Ser. No. 7,018
11 Claims. (Cl. 172—210)

The present invention relates in general to two way plows, i.e., to plows which are reversible so that they always displace the earth being plowed in the same direction when traveling in opposite directions along parallel paths. More particularly, the invention relates to a two way or reversible plow of the type in which a plow beam carrying plowing blades, such as discs, is pivotable about an upright axis between two operating positions angularly spaced from and located on opposite sides of the longitudinal or fore-and-aft axis of the plow. With such a reversible plow, the soil being plowed can always be displaced in the same direction, despite reversals in the direction of travel, by pivoting the plow beam from one of its operating positions to the other upon reversing the direction of travel.

The invention contemplates a plow which includes a frame having at the front end thereof means for attachment to a hitch means capable of raising and lowering the frame to lift the discs out of the ground and to lower them into plowing engagement with the ground, respectively. Preferably, this hitch means is the usual three-point hitch in common use in agriculture and other fields to connect plows, or other implements, to tractors, or the like.

A primary object of the invention is to provide a plow having means responsive to raising of the frame by the hitch means for pivoting the plow beam about its upright pivot axis from one of its operating positions to the other. With this construction, the plow beam is pivoted from one operating position to the other automatically upon lifting of the plow clear of the ground preparatory to reversing the direction of travel. Consequently, it is unnecessary for the operator of the tractor, or the like, to swing the plow beam from one side to the other prior to reversing the direction of travel, this occuring automatically as the result of lifting the plow clear of the ground preparatory to reversing the direction of travel, which is an important feature of the invention.

Another object of the invention is to provide a means responsive to raising of the plow frame by the hitch means for pivoting the plow beam about its upright pivot axis which is actuable by the weight of at least a portion of the plow frame.

Another object is to provide a movable plow beam pivoting means which is selectively engageable with the plow beam at points on opposite sides of the upright pivot axis of the plow beam so as to selectively pivot the beam in opposite directions, the beam pivoting means being actuable by the weight of at least a portion of the frame in response to raising of the frame by the hitch means.

Another object is to provide means responsive to lowering of the frame by the hitch means when the plow is re-engaged with the ground for selectively engaging the beam pivoting means with the plow beam at the spaced points mentioned.

A further object is to provide latch means for latching the plow beam in its two operating positions, such latch means being automatically disengaged from the beam upon lifting of the plow out of the ground and being automatically re-engaged with the beam upon lowering of the plow into plowing engagement with the ground.

Still another object is to provide a tail wheel pivotable about an upright axis, in response to pivoting of the plow beam between its operating positions, between corresponding operating positions in each of which the tail wheel resists the side thrust produced by the discs when they are in plowing engagement with the ground.

The foregoing objects, advantages, features and results of the present invention, together with various other objects, advantages, features and results thereof which will be evident to those skilled in the reversible or two way plow art in the light of this disclosure, may be achieved with the exemplary embodiments of the invention described in detatil hereinafter and illustrated in the accompanying drawings, in which:

FIG. 7 is a fragmentary view, partially in section and partially in side elevation, duplicating a portion of FIG. 2 on a larger scale;

FIG. 8 is a fragmentary sectional view taken along the arrowed line 8—8 of FIG. 7;

FIG. 9 is a plan view of another embodiment of the invention;

FIG. 10 is a side elevation of the plow of FIG. 9; and

FIG. 11 is a front view of the plow of FIGS. 9 and 10.

Figure 1:
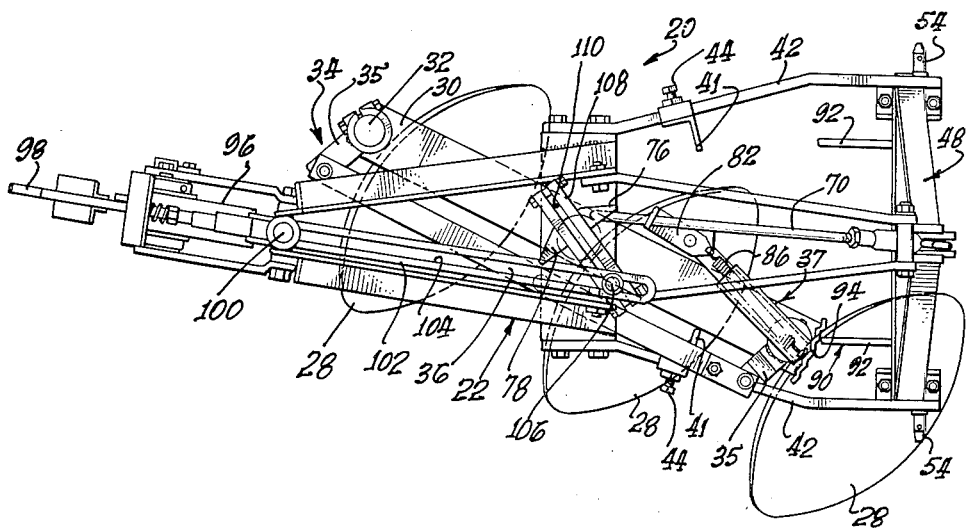
FIG. 1 is a plan view of a reversible plow which embodies the invention.
Figure 2:
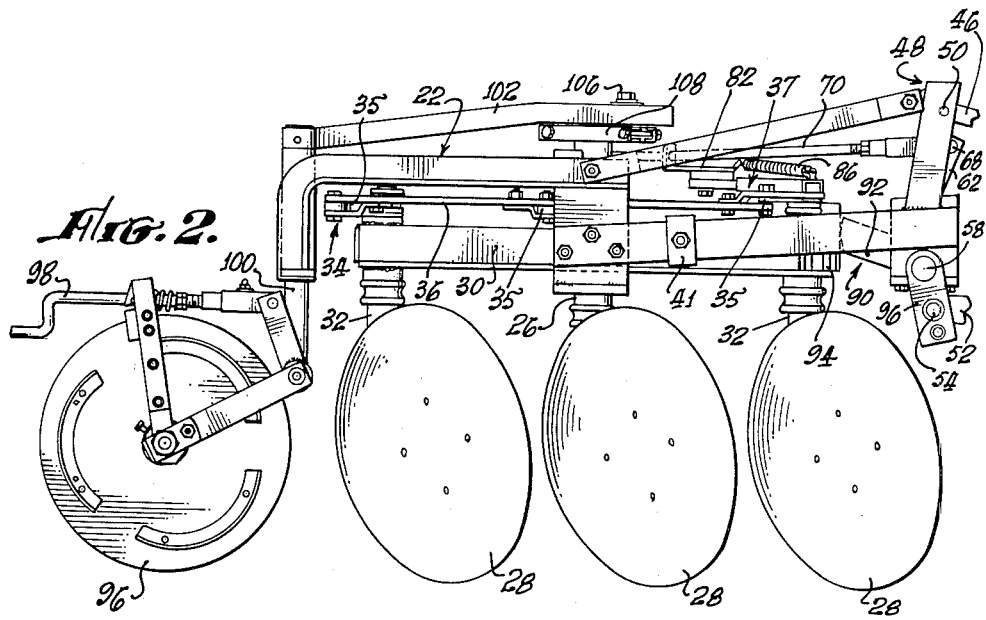
FIG. 2 is a side view of the plow of FIG. 1.
Figure 3:
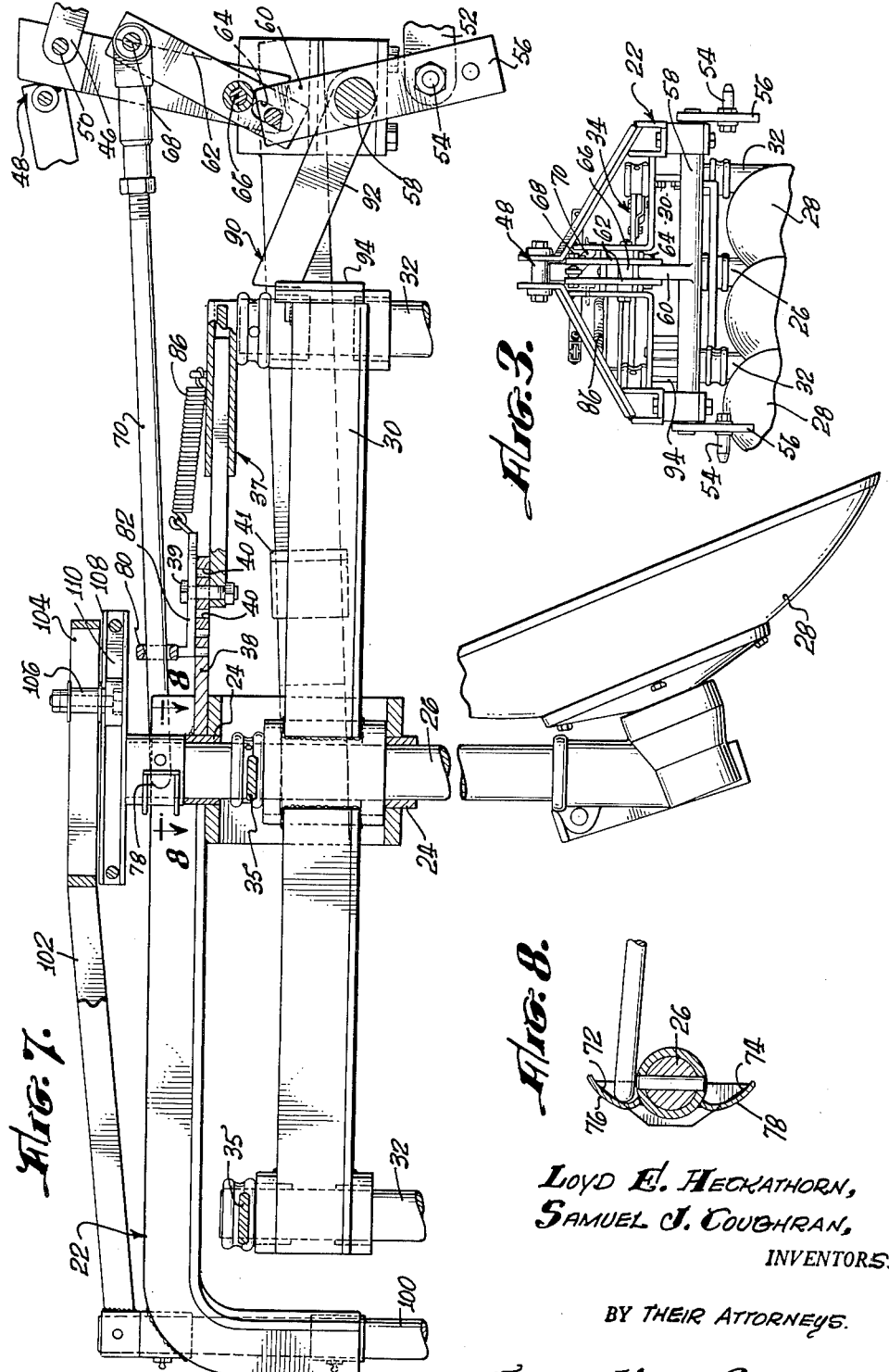
FIG. 3 is a front view of the plow of FIGS. 1 and 2.

Referring initially to FIGS. 1 and 2 of the drawings, the plow illustrated therein is designated generally by the numeral 20 ind includes a frame 22 which is generally triangular in plan and which converges from its front end to its rear end. As best shown in FIG. 7 of the drawings, the frame 22 is provided intermediate its ends with bearings 24 for an upright shaft 26 having a plow disc 28 secured thereto at its lower end. Mounted on the shaft 26 for pivotal movement relative to such shaft about the upright axis thereof is a plow beam 30. This plow beam is rotatably mounted on the shaft 26 intermediate its front and rear ends in the particular construction illustrated and has upright standards 32 rotatably mounted thereon at its front and rear ends, respectively. Additional discs 28 are secured to the lower ends of the standards 32.

Figure 4:
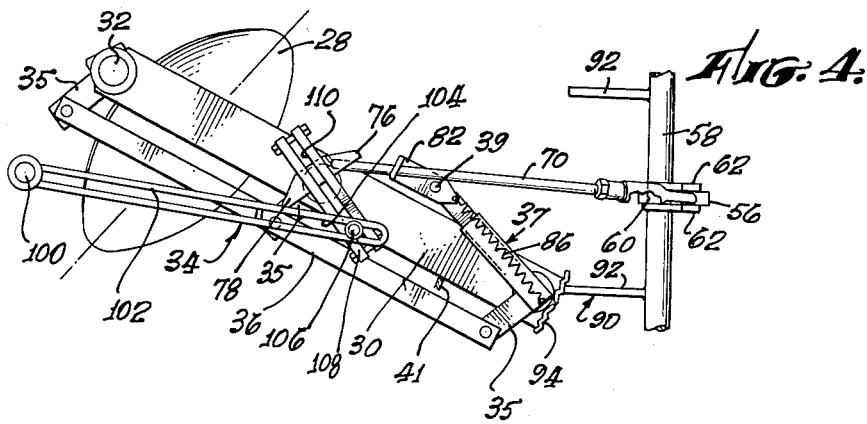
FIGS. 4, 5 and 6 are semidiagrammatic plan views illustrating the operation of the plow of FIGS. 1, 2 and 3.
Figure 5:
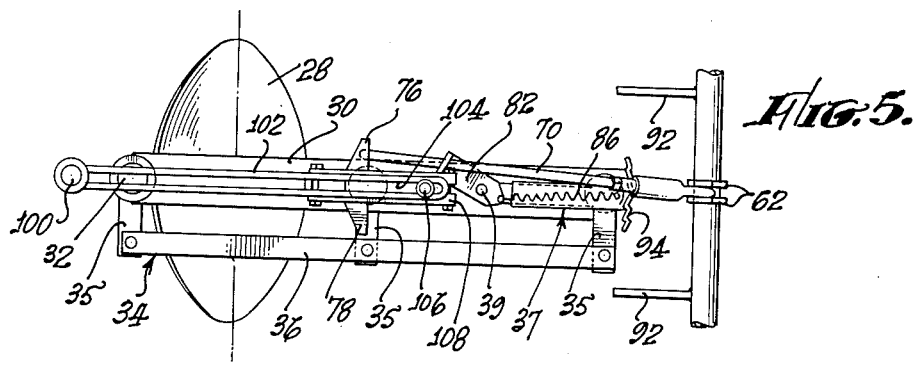
Figure 6:
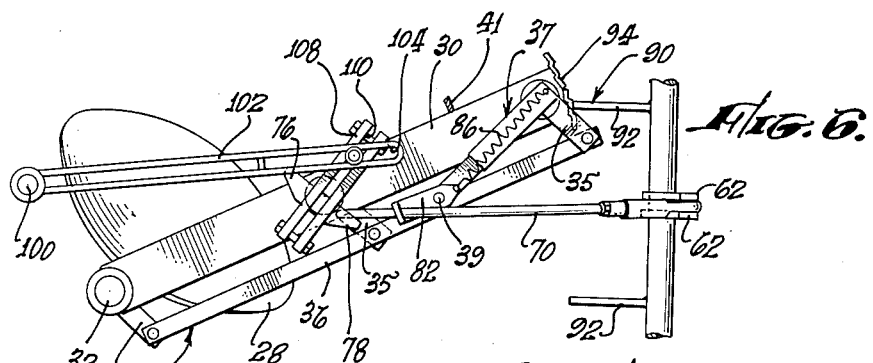

As shown in FIGS. 4, 5 and 6, when the shaft 26 is pivoted about its upright axis in a manner to be described hereinafter, the beam 30 is caused to pivot about such axis between two operating positions respectively located on opposite sides of and spaced angularly from the longitudinal or fore-and-aft axis of the frame 22. As will be described hereinafter, the discs 28 pivot in unison between two operating positions respectively disposed on opposite sides of an angularly spaced from the longitudinal axis of the beam 30 as the beam pivots between its operating positions. More particularly, when the beam 30 is in one of its operating positions, shown in FIG. 4 of the drawings, the discs 28 are angled away from the longitudinal axis of the beam in one direction and, when the beam is in its other operating position, shown in FIG. 6 of the drawings, the discs are angled away from the longitudinal axis of the beam in the opposite direction.

As will be apparent, when the beam 30 is in the operating position shown in FIG. 4 of the drawings, the discs 28 plow to the right and, when the beam is in the operating position shown in FIG. 6, the discs plow to the left. As is well known in the art, the operating position of the beam 30 is reversed each time the direction of travel of the plow 20 along parallel paths is reversed, whereby the discs 28 always displace earth in the same direction relative to the field being plowed.

Considering how the discs 28 are caused to pivot in unison from one side of the beam 30 to the other as the beam pivots between its operating positions, the shaft 26 and the standards 32 are interconnected by a parallelogram-type linkage 34 which includes arms 35 respectively rigidly secured to the shaft 26 and the standards 32 and pivotally interconnected by a link 36. As shown in FIGS. 1, 2 and 4 to 6 of the drawings, and as best shown in FIG. 7 thereof, the standard 32 at the front end of the beam 30 has rigidly connected thereto one end of a two-piece, telescoping strut 37 the other end of which is pivotally connected to a member 38 of the frame 22 by means of a pin 39 disposed in one hole of a longitudinal row of holes 40 in the frame member 38. As will be apparent from FIGS. 4 to 6, as the beam 30 is pivoted between its operating positions relative to the frame 22, the parallelogram linkage 34 and the telescoping strut 37 cause the discs 28 to pivot relative to the beam 30 between their operating positions. The angle through which the discs 28 pivot relative to the beam 30 may be varied by varying the location of the pin 39 in the row of holes 40, thereby varying the lead angle of the discs 28.

Variations in the width of the swath plowed by the discs 28 are provided for by adjustable stops 41 which control the angular displacement of the beam 30 relative to the fore-and-aft axis of the frame 22. As best shown in FIG. 1 of the drawings, the stops 41 are slidable along forwardly-divergent members 42 of the frame 22 and are adjustably secured by set screws 44, or the like. By moving the stops 41 rearwardly and forwardly along the frame members 42, the angular swing of the beam 30 between its operating positions is respectively increased and decreased. At the same time, the angles through which the discs 28 swing relative to the beam 30 are respectively increased and decreased correspondingly by the telescoping strut 37 and the parallelogram linkage 34.

As previously outlined, the key feature of the present invention is that the plow beam 30 is swung about its upright pivot axis from one of its operating positions to the other by the weight of at least a portion of the frame 22 in response to raising of the frame in lifting the discs 28 out of the ground at the end of a traverse across the field being plowed. The means for accomplishing this will now be considered.

The plow 20 is adapted to be connected to a tractor, or the like, by a conventional three-point hitch or hitch means which includes an upper link 46, FIGS. 2 and 7, pivotally connected to a fixed portion 48 of the frame 22 by an upper hitch pin 50. The hitch also includes two lower links 52, FIGS. 2 and 7, respectively connected at their rearward ends to coaxial lower hitch pins 54, FIGS. 1, 2, 3 and 7. As is conventional, the hitch includes means, such as a hydraulic motor of the reciprocating type, not shown, for pulling forwardly on the upper link 46 of the hitch.

Normally, the lower pins 54 are on fixed portions of the frame 22. Consequently, when the upper link 46 is pulled forwardly by the hitch, the entire plow 20 immediately begins to pivot in the clockwise direction, as viewed in FIGS. 2 and 7 of the drawings, about the axis of the lower pins 54 to lift the discs 28 clear of the ground.

However, in accordance with the present invention, as embodied in the plow 20 of FIGS. 1 to 8 of the drawings, the lower hitch pins 54 are carried by arms 56 fixed on a lateral or transverse shaft 58 pivotally mounted on the main portion of the frame 22 adjacent the front end thereof. As best shown in FIG. 7 of the drawings, the shaft 58 has fixed thereon an arm 60 which is connected to a lever 62 by a pin-and-slot connection 64, the lever 62 being pivotally connected intermediate its ends to the main portion of the frame 22 by a pin 66. The end of the lever 62 opposite the pin-and-slot connection 64 is pivotally connected, at 68, to a longitudinal or fore-and-aft push rod 70 which constitutes a movable means for pivoting the beam 30 from one of its operating positions to the other. More particularly, the rear end of the push rod 70 is shiftable laterally from one of two actuating positions to the other and, in each such actuating position, is insertable into one of two sockets 72 and 74 respectively provided by lateral arms 76 and 78 secured to the upper end of the shaft 26, the arms 76 and 78 being disposed on opposite sides of such shaft.

As will be apparent from FIG. 7 of the drawings, as the discs 28 are lifted out of the ground by a pull force applied to the upper link 46 of the hitch, the weight of the plow 20, or, more accurately, the weight of the main portion of the frame 22 and the components carried thereby, causes the lower links 52 to apply rearward push forces to the arms 56 carrying the lower hitch pins 54, whereby such arms are pivoted in the clockwise direction, as viewed in FIG. 7, to pivot the shaft 58 in such direction. Clockwise pivoting of the shaft 58, as view in FIG. 7, results in pivoting of the arm 60 in the same direction and such arm, acting through the pin-and-slot connection 64, causes the lever 62 to pivot in the counterclockwise direction, the angular extents of the pivoting of the arm 60 and the lever 62 being limited by the relative movement permitted by the pin-and-slot connection 64. Counterclockwise pivoting of the lever 62 results in rearward movement of the push rod 70, whereupon the push rod pivots the shaft 26 about its upright axis in one direction or the other, depending on which of the sockets 72 and 74 receives the rearward end of the push rod. Such pivoting of the shaft 26 by the push rod 70 swings the beam 30 from one of its operating positions to the other relative to the frame 22 and throws the discs 28 to one side or the other of the beam 30 by virtue of the hereinbefore-described interaction between the telescoping strut 37 and the parallelogram linkage 34.

As will be explained hereinafter, when the plow 20 is plowing to the right, the rearward end of the push rod 70 is disposed in the left socket 72 and, when the plow is plowing to the left, the rearward end of the push rod is disposed in the right socket 74. Consequently, as the plow 20 is lifted clear of the ground after plowing to the right, the push rod 70 swings the beam 30 and the discs 28 to the left to ready the plow for plowing to the left upon reversal of the direction of travel of the plow. Conversely, as the plow 20 is lifted out of the ground after plowing to the left, the push rod 70 swings the beam 30 and the discs 28 to the right to ready the plow for plowing to the right upon reversal of the direction of travel. Such reversals of the positions of the beam 30 and the discs 28 are accomplished entirely automatically by the weight of a major portion of the plow 20 as the plow is lifted out of the ground at the end of each traverse of the field being plowed. Consequently, it is unnecessary for the operator of the tractor to do anything to reverse the plow 20, other than to actuate the hitch in the usual manner to lift the plow out of the ground, which is an important feature of the invention.

Considering the manner in which the rearward end of the push rod 70 is selectively engaged with the lateral arms 76 and 78, the push rod extends through an apertured lug 80 at one end of a selector 82 which is pivotally connected intermediate its ends to the frame 22. In the particular construction illustrated, the selector 82 is pivotally connected to the frame member 38 by the same pin 39 which is utilized to pivotally connect one end of the telescoping strut 37 to this frame member. The end of the selector 82 opposite the apertured lug 80 has connected thereto one end of a tension spring 86, the opposite end of such spring being movable with the beam 30, as by securing it to the piece of the telescoping strut 37 which is rigidly secured to the standard 32 at the forward end of the beam.

Considering FIGS. 4, 5 and 6 of the drawings consecutively, it will be seen that as the weight of the major portion of the plow 20 causes the beam 30 to swing from the operating position shown in FIG. 4 to the operating position shown in FIG. 6, one end of the spring 86 swings with the beam to cause the spring to tend to pivot the selector 82 in the counterclockwise direction so as to tend to cause the selector to shift the push rod 70 from the socket 72 to the socket 74. This condition is shown in FIG. 5 of the drawings. However, as long as there is a load on the push rod 70, it cannot be shifted from the socket 72 to the socket 74. Consequently, when the beam 30 arrives at the operating position shown in FIG. 6 of the drawings, the push rod 70 remains in the socket 72 until the load is removed therefrom. Removal of the load from the push rod is effected by lowering of the plow 20 into plowing engagement with the ground after the direction of travel has been reversed, such lowering of the plow causing the lower links 52 of the hitch to pull forwardly on the arms 56 to rotate the lever 62 in the clockwise direction and thus move the push rod forwardly. As soon as the load is removed from the push rod 70 in this manner, the spring 86 pivots the selector 82 in the counterclockwise direction to cause the selector to move the rear end of the push rod 70 from the socket 72 into the socket 74. At this point, the various components are in positions to swing the beam 30 from the operating position shown in FIG. 6 back to the operating position shown in FIG. 4 the next time the plow 20 is lifted out of the ground. In a similar manner, the spring 86 and the selector 82 shift the rear end of the push rod 70 from the socket 74 back to the socket 72 after the beam 30 has been pivoted back to the operating position of FIG. 4 and after the plow 20 has been reengaged with the ground to again take the load off the push rod 70. As will be clear from FIGS. 4 to 6 of the drawings, the pivoted selector 82 and the spring 86 connected thereto operate with an over-center, toggle-type action, i.e., the spring is shifted over center from a position wherein it positively urges the selector in one direction to a position wherein it positively biases the selector in the opposite direction. Thus, the selector 82 and its spring 86 form a toggle mechanism or means for positively shifting the push rod 70 over center from engagement with one of the arms 72 and 74 into engagement with the other.

Thus, it will be apparent that swinging of the beam 30 back and forth between its two operating poistions occurs completely automatically, the beam being shifted from one operating position to the other by the push rod 70 when the plow 20 is lifted out of the ground and the push rod being shifted into a position preparatory to swinging the beam in the opposite direction upon reengagement of the plow with the ground. All of this requires no attention whatsoever from the operator of the tractor, or the like, the action being carried out entirely by the weight of the major portion of the plow 20 as the plow is lifted out of the ground and is subsequently lowered into the ground.

The beam 30 is latched in each of its operating positions by a latch means 90 which comprises two latch elements or arms 92 fixed on the shaft 58, there being one latch arm for each operating position of the beam. Each latch arm 92 is engageable with a serrated latch element or surface 94 on the front end of the beam 30. The reason for utilizing a serrated latch surface 94 is to provide for engagement of one or the other of the latch arms 92 therewith despite variations in the operating positions of the beam 30 by the adjustable stops 41. Thus, the latch arms 92 will always find a groove in the latch surface 94 even though the angular throw of the beam 30 is changed by means of the adjustable stops 41.

Referring particularly to FIG. 7 of the drawings, it will be apparent that when the shaft 58 is rotated in the clockwise direction to displace the push rod 70 rearwardly in order to swing the beam 30, the latch arm 92 which happens to be in engagement with the latch surface 94 is also rotated in the clockwise direction to disengage it from such latch surface. When the plow 20 is subsequently lowered into the ground and pull forces are applied to the lower links 52 of the hitch in pulling the plow, the shaft 58 is rotated in the counterclockwise direction, as viewed in FIG. 7, to reengage the appropriate one of the latch arms 92 with the serrated latch surface 94, thereby latching the beam in its operating position. It might be pointed out here that such counterclockwise rotation of the shaft 58 also displaces the push rod 70 forwardly so that the selector 82 is free to shift the rear end of the push rod from one of the sockets 72 and 74 to the other as the plow 20 is lowered into the ground.

The plow 20 includes a tail wheel 96 for resisting side loads imposed on the plow by the discs 28. As is conventional, this tail wheel is vertically adjustable, by means of a crank 98, to control the depth of cut by the discs 28. The tail wheel 96 is carried by an upright shaft 100 which is pivotally mounted on the frame 22 at the rear end thereof so that the tail wheel may swing from one side to the other as the beam 30 swings from one of its operating positions to the other, the tail wheel always being positioned to resist the side loads produced by the discs 28, irrespective of whether the plow 20 is plowing to the left, or the right. As is conventional, the tail wheel is displaced to the left when the beam 30 is in operating position of FIG. 4 so that the plow is plowing to the right. Conversely, the tail wheel is displaced to the right when the beam 30 is in the operating position of FIG. 6 so that the plow is plowing to the left.

The plow 20 includes means for automatically swinging the tail wheel 96 between operating positions corresponding to the operating positions of the beam 30 as the beam is swung between its operating positions. Thus, the operator of the tractor, or the like, to which the plow 20 is attached need not be concerned with changing the operating position of the tail wheel 96, this being done automatically.

Considering how the foregoing is accomplished, connected to the upper end of the tail wheel shaft 100 is a longitudinal arm 102 having a track 104 which receives a pin 106 on an arm 108 secured to the upper end of the pivot shaft 26 for the beam 30. As will be apparent by considering FIGS. 4, 5 and 6 of the drawings consecutively, as the beam 30 swings from one of its operating positions to the other, the pin 106 on the arm 108 swings the arm 102 to swing the tail wheel 96 from one of its operating positions to the other correspondingly. The arm 108 provides a track 110 in which the pin 106 may be fixed in various positions to vary the throw of the tail wheel 96. The pin 106 may be locked in various positions along the track 110 in any suitable manner, not specifically shown in the drawings.

Referring now to FIGS. 9 to 11 of the drawings, illustrated therein is a plow 120 which is similar to the plow 20 and the components of which are identified by reference numerals higher by 100 than the reference numerals utilized to identify corresponding components of the plow 20. The only difference between the plow 120 and the plow 20 is that, in the plow 120, the weight of only a minor portion of the frame 122 is utilized to move the beam 130 between its operating positions, and to perform related functions.

More particularly, in the plow 120, the lower hitch pins 154 are mounted on a downward extension of the fixed portion 148 of the frame 122. Thus, both the upper hitch pin 150 and the lower hitch pins 154 are mounted on the fixed portion 148 of the frame 122.

To achieve the desired swinging of the beam 130, and to perform related functions, a rear portion 211 of the frame 122 is connected to the main or body portion of the frame 122 by a transverse pivot means 212. The rear frame portion 211 includes two laterally spaced arms 214 which are pivotally connected to the main or body portion of the frame 122 by coaxial, axially spaced pivot pins forming the pivot means 212. Forwardly of the pivot means 212, the arms 214 are pivotally connected to links 216 by pivot pins 218. The links 216 are pivotally connected to the main or forward portion of the frame 122 by pivot pins 220. Connected to the upper ends of the links 216 by pivot pins 222 are links 224, these links being connected at their forward ends to arms 226 on the shaft 158 by a pin 228. The push rod 170 is pivotally connected to the arms 226. The latch arms 192 are integral with the arms 226, respectively.

In operation of the plow 120, when it is lifted out of the ground by the hitch connected to the upper hitch pin 150 and the lower hitch pins 154, the rear frame portion 211 pivots downwardly about the axis of the pivot means 212. Consequently, the links 216 are caused to pivot rearwardly, i.e., in the counterclockwise position as viewed in FIG. 10, about the axis of the pivot pins 220, thereby displacing the links 224 rearwardly. Such rearward displacement of the links 224 rotates the latch arms 192 downwardly to disengage from the latch surface 194 that latch arm which was in engagement therewith. At the same time, the links 224 displace the push rod 170 rearwardly to swing the beam 130 from one operating position to the other. The reverse action takes place when the plow 120 is lowered into the ground again, the rear frame portion 211 moving upwardly under such conditions to cause one of the latch arms 192 to engage the latch surface 194 and to cause forward movement of the push rod 170. In all other respects, the operation of the plow 120 is substantially identical to that of the plow 20 so that a further description is not necessary.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. In a reversible plow, the combination of: a frame having front and rear ends; plowing means pivotally mounted on said frame for movement relative thereto about an upright axis; two arms connected to said plowing means on opposite sides, respectively, of said axis; movable pivoting means selectively engageable with said arms for selectively pivoting said plowing means in opposite directions about said axis from one of two operating positions to the other thereof, said pivoting means being shiftable between two actuating positions wherein it is respectively engageable with said arms; hitch mounting means on said frame at said front end thereof for attachment to a hitch means for raising and lowering said frame; means interconnecting said hitch mounting means and said pivoting means and responsive to raising of said frame by the hitch means for moving said pivoting means to pivot said plowing means about said axis; and toggle means connected to said pivoting means for selectively shifting said pivoting means between said actuating positions.

2. In a reversible plow, the combination of: a frame having front and rear ends; plowing means pivotally mounted on said frame for movement relative thereto about an upright axis; two arms connected to said plowing means on opposite sides, respectively, of said axis; movable pivoting means selectively engageable with said arms for selectively pivoting said plowing means in opposite directions about said axis from one of two operating positions to the other thereof; means on said frame at said front end thereof for attachment to a hitch means for raising and lowering said frame; means connected to said pivoting means and actuable by the weight of at least a portion of said frame and responsive to raising of said frame by the hitch means for moving said pivoting means to pivot said plowing means about said axis; and toggle means connected to said pivoting means for selectively engaging said pivoting means with said arms.

3. In a reversible plow, the combination of: a frame having front and rear ends; a plow beam pivotally mounted on said frame for movement relative thereto about an upright axis; two arms connected to said beam on opposite sides, respectively, of said axis; movable beam pivoting means selectively engageable with said arms for selectively pivoting said beam in opposite directions about said axis from one of two operating positions to the other thereof, said beam pivoting means being shiftable between two actuating positions wherein it is respectively engageable with said arms; hitch mounting means on said frame at said front end thereof for attachment to a hitch means for raising and lowering said frame; means interconnecting said hitch mounting means and said beam pivoting means and responsive to raising of said frame by the hitch means for moving said beam pivoting means to pivot said beam about said axis; and toggle means connected to said beam pivoting means and responsive to lowering of said frame by the hitch means for selectively shifting said beam pivoting means between said actuating positions.

4. In a reversible plow, the combination of: a frame having front and rear ends; a plow beam pivotally mounted on said frame for movement relative thereto about an upright axis; two arms connected to said beam on opposite sides, respectively, of said axis; movable beam pivoting means selectively engageable with said arms for selectively pivoting said beam in opposite directions about said axis from one of two operating positions to the other thereof; hitch mounting means on said frame at said front end thereof for attachment to a hitch means for raising and lowering said frame; means interconnecting said hitch mounting means and said beam pivoting means and actuable by the weight of at least a portion of said frame and responsive to raising of said frame by the hitch means for moving said beam pivoting means to pivot said beam about said axis; and toggle means connected to said beam pivoting means and responsive to lowering of said frame by the hitch means for selectively engaging said beam pivoting means with said arms.

5. In a reversible plow, the combination of: a frame having front and rear ends; a plow beam pivotally mounted on said frame for movement relative thereto about an upright axis; two lateral arms connected to said beam on opposite sides, respectively, of said axis; movable beam pivoting means comprising a longitudinal push rod selectively engageable with said arms for selectively pivoting said beam in opposite directions about said axis from one of two operating positions to the other thereof; hitch mounting means on said frame at said front end thereof for attachment to a hitch means for raising and lowering said frame; means interconnecting said hitch mounting means and said beam pivoting means and actuable by the weight of at least a portion of said frame and responsive to raising of said frame by the hitch means for moving said beam pivoting means to pivot said beam about said axis; and toggle means connected to said beam pivoting means and responsive to lowering of said frame by the hitch means for selectively engaging said beam pivoting means with said arms.

6. In a reversible plow, the combination of: a frame having front and rear ends; a plow beam pivotally mounted on said frame for movement relative thereto about an upright axis; two arms connected to said beam on opposite sides, respectively, of said axis; movable beam pivoting means selectively engageable with said arms for selectively pivoting said beam in opposite directions about said axis from one of two operating positions to the other thereof; hitch mounting means on said frame at said front end thereof for attachment to a hitch means for raising and lowering said frame; means interconnecting said hitch mounting means and said beam pivoting means and actuable by the weight of at least a portion of said frame and responsive to raising of said frame by the hitch means for moving said beam pivoting means to pivot said beam about said axis; means connected to said beam pivoting means and responsive to lowering of said frame by the hitch means for selectively engaging said beam pivoting means with said arms; two latch means selectively engageable with said beam for respectively latching said beam in its said operating positions; and means connected to said latch means and responsive to raising of said frame by the hitch means for disengaging said latch means from said beam and responsive to lowering of said frame by the hitch means for engaging said latch means with said beam.

7. In a reversible plow, the combination of: a frame having front and rear ends; a plow beam pivotally mounted on said frame for movement relative thereto about an upright axis; two arms connected to said beam on opposite sides, respectively, of said axis; movable beam pivoting means selectively engageable with said arms for selectively pivoting said beam in opposite directions about said axis from one of two operating positions to the other thereof; hitch mounting means on said frame at said front end thereof for attachment to a hitch means for raising and lowering said frame; means interconnecting said hitch mouting means and said beam pivoting means and actuable by the weight of at least a portion of said frame and responsive to raising of said frame by the hitch means for moving said beam pivoting means to pivot said beam about said axis, means connected to said beam pivoting means and responsive to lowering of said frame by the hitch means for selectively engaging said beam pivoting means with said arms; and adjustable interengageable stop means on said beam and said frame for varying the range of angular movement of said beam about said axis, thereby varying the angle between said operating positions of said beam.

8. In a reversible plow, the combination of: a frame having front and rear ends; a plow beam pivotally mounted on said frame for movement relative thereto about an upright axis; two arms connected to said beam on opposite sides, respectively, of said axis; movable beam pivoting means selectively engageable with said arms for selectively pivoting said beam in opposite directions about said axis from one of two operating positions to the other thereof; hitch mounting means on said frame at said front end thereof for attachment to a hitch means for raising and lowering said frame; means interconnecting said hitch mounting means and said beam pivoting means and actuable by the weight of at least a portion of said frame and responsive to raising of said frame by the hitch means for moving said beam pivoting means to pivot said beam about said axis; means connected to said beam pivoting means and responsive to lowering of said frame by the hitch means for selectively engaging said beam pivoting means with said arms; a tail wheel pivotally connected to said frame at said rear end thereof and pivotable relative thereto about a second upright axis rearwardly of the first upright axis mentioned; and means interconnecting said beam and said tail wheel for pivoting said tail wheel about said second upright axis in response to pivoting of said beam about said first-mentioned upright axis.

9. In a reversible plow, the combination of: a frame having front and rear ends; a plow beam pivotally mounted on said frame for movement relative thereto about an upright axis; means on said frame at said front end thereof for attachment to a hitch means for raising and lowering said frame; means for pivoting at least a portion of said frame relative to the hitch means about a lateral axis; and means connected to and actuable by the weight of said portion of said frame and responsive to raising of said frame by the hitch means and engageable with said beam for pivoting said beam about said upright axis.

10. In a reversible plow, the combination of: a frame having front and rear ends; a plow beam pivotally mounted on said frame for movement relative thereto about an upright axis; means on said frame at said front end thereof for attachment to a hitch means for raising and lowering said frame; means for pivoting at least a portion of said frame relative to the hitch means about a lateral axis located adjacent said front end of said frame; and means connected to and actuable by the weight of said portion of said frame and responsive to raising of said frame by the hitch means and engageable with said beam for pivoting said beam about said upright axis.

11. In a reversible plow, the combination of: a frame having front and rear ends; a plow beam pivotally mounted on said frame for movement relative thereto about an upright axis; means on said frame at said front end thereof for attachment to a hitch means for raising and lowering said frame; means for pivoting at least a portion of said frame relative to the hitch means about a lateral axis located intermediate said front and rear ends of said frame; and means connected to and actuable by the weight of said portion of said frame and responsive to raising of said frame by the hitch means and engageable with said beam for pivoting said beam about said upright axis.

References Cited in the file of this patent

UNITED STATES PATENTS

| 2,578,942 | Onfrey | Dec. 18, 1951 |
| 2,963,097 | Silver | Dec. 6, 1960 |

FOREIGN PATENTS

| 948,092 | Germany | Aug. 30, 1956 |

OTHER REFERENCES

Gebrüder Eberhardt: German application 1,018,664, printed Oct. 31, 1957 (Klasse 45a12).